(12) United States Patent
Lance et al.

(10) Patent No.: US 12,314,420 B2
(45) Date of Patent: May 27, 2025

(54) QUERY MANAGEMENT IN A STREAMING SYSTEM

(71) Applicant: CrowdStrike, Inc., Sunnyvale, CA (US)

(72) Inventors: Kenton Lance, Hillsboro, OR (US); Brent Ryan Nash, Ladera Ranch, CA (US); Matthew Rowen, Milton (GB); William Morgan, Tampa, FL (US)

(73) Assignee: CrowdStrike, Inc., Sunnyvale, CA (US)

( * ) Notice: Subject to any disclaimer, the term of this patent is extended or adjusted under 35 U.S.C. 154(b) by 276 days.

(21) Appl. No.: 18/115,647

(22) Filed: Feb. 28, 2023

(65) Prior Publication Data

US 2024/0289481 A1    Aug. 29, 2024

(51) Int. Cl.
*G06F 21/56* (2013.01)
*G06F 21/62* (2013.01)

(52) U.S. Cl.
CPC ........ *G06F 21/6227* (2013.01); *G06F 21/562* (2013.01)

(58) Field of Classification Search
CPC ...... G06F 21/62; G06F 21/56; G06F 21/6227; G06F 21/562
See application file for complete search history.

(56) References Cited

U.S. PATENT DOCUMENTS

| | | | |
|---|---|---|---|
| 12,061,714 B2 * | 8/2024 | Das | G06F 16/2452 |
| 2010/0185678 A1 * | 7/2010 | Dettinger | G06F 21/6227 |
| | | | 707/E17.005 |

FOREIGN PATENT DOCUMENTS

| | | | | |
|---|---|---|---|---|
| GB | 2580467 A | * | 7/2020 | G06F 16/1734 |
| KR | 20230097438 A | * | 7/2023 | G06F 21/55 |

* cited by examiner

*Primary Examiner* — Jayesh M Jhaveri
(74) *Attorney, Agent, or Firm* — Lee & Hayes, P.C.

(57) ABSTRACT

Techniques to manage queries for managing queries that detect activity associated with a data stream of a computing device. A system can receive a request to implement a query from a device, test the query in a test environment, and determine whether or not to deploy the query to a production environment that includes one or more host devices. The system can generate an instruction and/or a query identifier to control a start time and/or an end time for a query.

20 Claims, 6 Drawing Sheets

QUERY MANAGEMENT IN A STREAMING SYSTEM

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

sing one or more queries as described herein.

DETAILED DESCRIPTION

Figure 1:
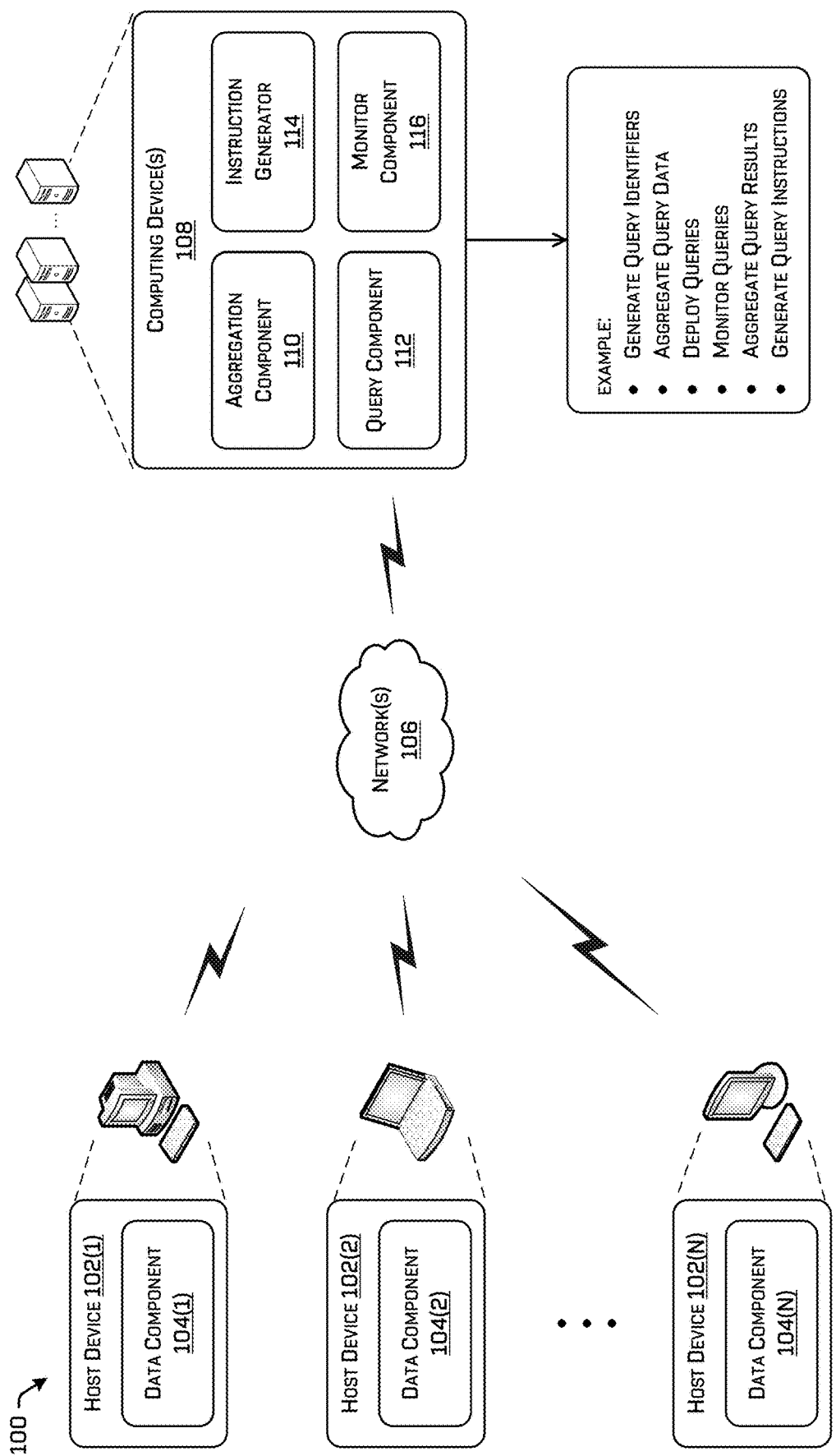
FIG. 1 illustrates an example block diagram of an example computer architecture for managing queries that monitor a plurality of host devices as a service, as described herein.

This application is directed to a system for managing queries that detect activity associated with a data stream of a computing device. For instance, the system can receive data stream data associated with one or more data stream from one or more computing devices and perform queries to detect different activity in the data stream data. The activity can relate to potential security threats such as a process, a thread, executable, or other activity in the data stream. In some examples, the system can initiate a query to determine incidents (e.g., accessing a memory, file, document, or other activity) that may occur in the data stream. The system can be implemented as a cloud-based service to the one or more computing devices and be configured to monitor the data streams of various devices in real-time to identify activity of interest, such as activity that may impact operation of the device.

In various examples, the system can receive a request to implement a query from a device, execute the query in a test environment, and determine whether or not to deploy the query to a production environment that includes a host device. The system can implement one or more components to assign a query identifier to a new query and to treat a change, update, or modification to an existing query as a different query that is assigned a unique query identifier. The query identifiers can be used by the system in a variety of ways including to control deployment of an initial query, to track results of a query, and/or to control when a query begins or ends. In some examples, the system can generate an instruction that controls a start time and/or an end time for one or more queries to ensure that the data stream is monitored by at least one query over time. By implementing the techniques described herein, a computing device can dedicate computational resources to execute a first query (e.g., an initial query) and a second query (e.g., an update to the first query) at a same time to capture events for analysis that may represent the potential security threats in the data stream.

The system can, for example, comprise one or more additional computing devices (e.g., a server, a data center, etc.) that execute queries remote from the one or more computing devices being monitored. In such examples, the system can implement one or more components to initiate a query to identify activity in the data steam data (e.g., a copy of each data stream associated with the one or more computing device can be directed to the system). Queries can operate to identify a variety of different activity associated with the data stream including, for example, identifying data written to a windows registry, a file system, or a document; or identifying activity associated with an open network socket or a Domain Name System (DNS) look-up, among others. More generally, the activity can represent a process, a thread, code, bytes, a data packet, or an instruction accessing or requesting access to a particular portion of a host device. The system can, for instance, remotely initiate a query, analyze query results, and recommend a change to a query independent of the devices monitored being explicitly aware of the queries being performed. However, in other examples, the devices can include a component that is configured to perform at least some of the functionality associated with the components of the system.

Generally, the system can include functionality to define, initiate, update, complete, or otherwise control execution of a query associated with a computing device in a production environment as part of a query service. In some examples, the system can generate computer-readable instructions to control each query independently using the query identifiers. Queries can be controlled to capture an activity of interest such as changes to a process or thread executing on a host device (or a service agent thereof) over a period of time. By implementing the query management techniques described herein, queries can be defined and deployed to detect events (and incidents associated therewith) most likely to cause malicious behavior on the host device.

By way of example and not limitation, the system can create a new query, update an existing query, or complete a query. A new query can be initiated by a user associated with a host device (e.g., to identify data defined by the user) and/or a user or model of the system (e.g., an administrator of the service or a model can analyze query results and change a query). The system can determine a query identifier based on data associated with the request which can include, for example, a query name, criteria for running the query, etc. Defining the query can include one or more of: compiling data associated with the query, determining a query identifier, determining metadata to associate with the query, determining parameters describing where to store, send, or manage query results, just to name a few. The query can also include query criteria indicating information to "look for" when the query is executed by a processor of the host device (or in some cases a test device prior to deploying the query to the host device, as described herein). For example, the query criteria associated with the query can be updated to add new functionality, fix a bug, or otherwise improve accuracy of results by the query (or determination therefrom). The query criteria can, in various examples, be determined by a user associated with the host device, a user associated with the system, and/or a model (e.g., a heuristic model, a statistical model, a machine learned model, or the like) of the system or the host device.

As mentioned, each query can be defined, or configured, to detect different types of incidents associated with one or more events that occurred, or are occurring, on the host device within a time interval. The incident may indicate that the monitored host device may or may not have been "compromised" by malicious behavior (e.g., adversarial activity, malware, etc.) based on the information gathered from the detected events. In some examples, the system may communicate data for events performed by one or more programs on a monitored host device. As described herein, the data may be analyzed by a same or different system to detect patterns in the events representing a variety of potential security threats.

In some examples, the system can determine how to deploy a query to multiple host devices in a production environment that minimizes an impact on operation of the host devices caused by initiating the query. For instance, the query can be deployed to different host devices at different times based on a risk level (or risk score) associated with each host device. The system can also or instead deploy a query to different production environments based on a risk level (or risk score) associated with each production environment. In this way, a query can be deployed over time, while also being monitored after deployment to ensure that the query functions as expected and does not degrade functioning of the host device(s).

In various examples, the system can determine whether to run a query request from a host device on a test device in a test environment or a host device in a production environment. For instance, queries can be tested in a pre-production environment to ensure that a particular query meets or exceeds performance metric(s) before being deployed in the production environment. The pre-production environment (or test environment) can include a test device that is configured with an operating system, settings, input data stream, and so on, similar to the host device such that results of running the query on the test device can be used to predict whether invoking the query on the host device is likely to cause a change in operation of the host device.

In additional or alternative examples, for instance without use of a pre-production environment, the system can initially deploy a query to less than all the host devices in the production environment and determining whether a correlation exists between a change in performance of the host device(s) and the deployment of the query. Further, the system can determine whether to deploy a query to another production environment based on evaluating a risk score associated with each production environment. In other words, a production environment may support host devices that require different levels of security and/or may be ranked relative to another production environment. In this way, the risk scores can be used to determine when to deploy a query to another production environment.

In some examples, the system can be implemented to add, remove, or modify a query by generating an instruction (e.g., a computer-readable instruction) executable by a processor associated with a computing device. For example, the system can generate a first computer-readable instruction to enable a first query to complete processing related to detected events, and a second computer readable instruction to initiate a second query while the first query completes all backend processes for a detected event. The system can, in various examples, associate the instruction(s) with the query identifier(s) for sending over a network to one or more computing devices (e.g., a host device, a test device, a computing device implemented by the system that is remote from the host device, and the like) to cause the one or more computing devices to start, stop, or pause execution of the query.

In some examples, the system can implement a monitoring component to monitor the query at different times before and/or after execution by a processor of a computing device. For instance, the monitoring component can access a portion of the data stream from a storage device (or receive the portion in real-time independent of the database), such as a data stream database that receives (and in some instances replicates) all data associated with the data stream, and verify that the query meets certain performance indicators when executed on the received data stream. The monitoring component can also or instead measure performance of a computing device before the query, during the query, and after completion of the query to assess an impact of running the query on the performance of the computing device.

In various examples, a query can be considered "complete" when the query is no longer monitoring the data stream. Using the techniques described herein, a "complete" query can still receive computational resources to execute processes related to a previously detected event which would normally be lost when another query begins to monitor the data stream (e.g., typically a first version of a query will no longer run when replaced by a second version). Because the system can control queries separately using unique query identifiers, two queries can "overlap" or otherwise use computational resources simultaneously (e.g., a first query can stop monitoring the data stream and complete one or more processes while a second query monitors the data stream) so as to monitor all information associated with the data stream.

In various examples, the system can output data associated with the queries for presentation in a user interface of a display device. For example, the user interface can enable a user to initiate a query, analyze query results, and/or provide input indicating criteria or a performance metric to use for a particular query. In some examples, functionality provided by the system can be implemented responsive to an input received via the user interface (e.g., to update a query or start new query). In various examples, the query results can be aggregated to present information useful for the user (or a model) to verify whether the events, instances, and the like in the query results have a malicious intent on the computing device.

The query management techniques described herein can improve functioning of a computing device by providing a robust and efficient method for controlling queries that accurately detect malicious behavior in a data stream in a testing environment and/or a production environment. For example, the computing device can determine when to deploy a query to capture all activity in a data stream given that any single activity (e.g., process, thread, etc.) can be associated with a security threat that impacts operation of a computing device.

Although in some examples the system comprises a computing device monitoring a host device, in other examples, the system may enable the query management techniques described herein to be performed by the host device independent of the computing device and/or independent of a network connection. That is, either the host device and/or the computing device may implement one or more components to control queries usable to detect possible malicious incident associated with an event.

In various instances, a computing device may install, and subsequently execute a security agent as part of a security service system to monitor and record events and/or patterns on a plurality of computing devices in an effort to detect, prevent, and mitigate damage from malware or malicious attack. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent can, for instance, reside on the host device, observe and analyze events that occur on the host device, and interacts with a security system to enable a detection loop that is aimed at defeating all aspects of a possible attack.

Some examples herein relate to detecting malware or malicious behavior by, for example, recording events performed by a processor executing one or more programs and analyzing distributions of the events by event type (e.g., a type of process, a type of thread, or lateral movement between host devices). For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware. Of course, the techniques can also be used to detect single, non-repetitive, instances that may occur in the data steam.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example block diagram 100 of an example computer architecture for managing queries that monitor a plurality of host devices as a service, as described herein. The diagram 100 may include one or more host device(s) 102(1), 102(2), . . . , 102(N) (individually and/or collectively referred to herein with reference 102), where N is any integer greater than or equal to 1, that interact with the computing device(s) 108 of a service system over network(s) 106. In various examples, the service system may be part of or associated with a cloud-based service network that is configured to implement aspects of the functionality described herein.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 108 communicate over the network(s) 106 using a secure protocol (e.g., https) and/or any other protocol or set of protocols, such as the transmission control protocol/Internet protocol (TCP/IP).

The host device 102 (sometimes called "host computing device," "host machine," or "monitored computing device") may implement one or more data components 104(1), 104(2), . . . , 104(N) (individually and/or collectively referred to herein with reference 104, where N is any integer greater than or equal to 1), which is stored in memory of the host device 102 and executable by one or more processors of the host device 102. The host devices 102 may be or include any suitable type of host devices 102, including, without limitation, a mainframe, a work station, a personal computer (PC), a laptop computer, a tablet computer, a personal digital assistant (PDA), a cellular phone, a media center, an embedded system, a robotic device, a vehicle, a Machine to Machine device (M2M), an unmanned aerial vehicle (UAV), an Internet of Things (IoT), or any other sort of device or devices capable of communicating via an instance of the data component 104. An entity may be associated with the host devices 102, and the entity may have registered for query and/or security services provided by a service provider of the computing device(s) 108.

The data component 104 can represent software, firmware, hardware, or a combination thereof, that is configured to exchange data with the computing device(s) 108, and the components thereof. In some examples, the data component 104 can be configured to send or receive data associated with a query to and/or from the computing device(s) 108. The data component 104 can cause a portion of the data stream to be sent to the computing device(s) 108 to enable the execution of a query by the computing device(s) 108 (e.g., by providing the data stream data). In some examples, the data component 104 can cause a query to execute on the data stream at the host device 102.

In some examples, the computing device(s) 108 can execute queries as described herein independent of the host device 102 including the data component 104. In other words, the host device(s) 102 need not include the data component 104 for the computing device(s) 108 to implement the techniques described herein.

The data component 104 may provide functionality for the host device 102 to interface with the computing device(s) 108 sufficient to manage queries as described herein (e.g., establish a branch of the data stream for sending to the computing device(s) 108, send query results, send user preferences, or the like).

The data component 104 may, in some examples, be kernel-level security agents, or similar security application or interface to implement at least some of the techniques described herein. Such kernel-level security agents may each include activity pattern consumers that receive notifications of events in a query that meet query criteria. The kernel-level security agents may each be installed by and configurable by computing device(s) 108, receiving, and applying while live, reconfigurations of agent module(s) and/or an agent situational model. Further, the kernel-level security agents may each output query results to the computing device(s) 108 that include the security-relevant information determined by the data component 104. The data component 104 may continue to execute on the host device 102 by observing and sending detected activity to the computing device(s) 108 while the host device 102 is powered on and running.

In some embodiments, the data component 104 may be connected to the computing device(s) 108 via a secure channel, such as a virtual private network (VPN) tunnel or other sort of secure channel and may provide query results security-relevant information to the computing device(s) 108 through the secure channel. The data component 104 may also receive configuration updates, instructions, remediation, etc. from the computing device(s) 108 via the secure channel.

The host device 102 may receive the data component 104 over the network(s) 106 from the computing device(s) 108 by downloading the data component 104 as a software package to be installed on the host devices 102. Together, the data component 104 of the host devices 102 and the computing device(s) 108 form a detection loop, which can be enabled by an agent architecture designed in accordance with the principles of the well-known OODA-loop (i.e., observe-orient-detect-act-loop). The data component 104 may include components that receive and/or send notifications of semantically-interesting query results (e.g., file writes and launching executables) from host operating system hooks or filter drivers, from user-mode activity pattern monitors, or from threads monitoring log files or memory locations. Thus, the data component 104 may observe query results (e.g., activity patterns over time), determine actions to take based on those query results, and/or send the query results to the computing device(s) 108 for further analysis.

The detected activity observed by the data component 104 (e.g., query results, and the like) may be sent over the network(s) 106 to the computing device(s) 108, with or without further processing by the data component 104. For example, in some embodiments, the detected activity observed by the data component 104 may be filtered using first configurable filters of the data component 104 to remove known safe activity patterns to help reduce size of data transfer and then sent to the computing device(s) 108. Alternatively, the detected activity can be sent to the computing device(s) 108 without further filtering on the host devices 102.

The data component 104 of the host device 102 may trigger varying levels of containment for the host device 102 based on varying levels suspicious events in an input data stream. In response to determining that the host device 102 is compromised (e.g., an incident is found in the event results), the computing device(s) 108 can send a containment instruction over the network 106 to the host device 102. Upon receipt of this containment instruction, the data component 104 may cause the host device 102 to enable (activate, trigger, etc.) network containment.

To enable network containment on the host device 102, the data component 104 can implement a firewall policy included with the data component 104. Upon enforcement of the firewall policy, a firewall of the host device 102 denies outgoing data packets from, and incoming data packets to, the host device 102 that would have been allowed prior to the implementing of the firewall policy. In some embodiments, the firewall policy, may deny all traffic to and from the host device 102 with respect to other computing systems having remote network addresses (e.g., Internet Protocol (IP) addresses) that are not otherwise specified in the firewall policy as an exception for allowed traffic. In various embodiments, however, network containment can be implemented on the host device 102 in a manner that allows some communication to/from the host device 102 with a network other than the network 106. For example, the firewall policy can specify exceptions for remote network addresses (e.g., third-parties) that are allowed to communicate with the host device 102 after containment is enabled/initiated and while the host device 102 remains contained. The firewall policy may allow some traffic to and from the computing device(s) 108 so that a communication channel remains open and usable between the host device 102 and the computing device(s) 108, even when the host device 102 is "contained" (or cutoff from communicating with the other host device(s) 102 besides the computing device(s) 108). To accomplish this result, the firewall policy can specify at least one remote network address (e.g., a remote IP address) associated with the computing device(s) 108, and may specify an action to allow outgoing data packets to, and incoming data packets from, the computing device(s) 108, which may be associated with the at least one remote network address that can be specified in the firewall policy. In some embodiments, the containment instructions may specify an action to block a specific suspicious activity pattern rather than trigger network containment if the suspicious activity pattern is limited in action.

In various examples, the computing device(s) 108 may include functionality to collect and analyze the observed query results (or observed incidents therein) received from host device(s) 102, to report on suspicious activity, and to mitigate any malware or malicious code found in the host device(s) 102.

As shown in FIG. 1, the computing device(s) 108 may include an aggregation component 110, a query component 112, an instruction generator 114, and a monitor component 116 to perform the functionality described herein.

In various examples, the aggregation component 110 may receive a request to initiate a query and aggregate information usable to define the query for execution. In various examples, the aggregation component 110 may gather data from various sources for processing by one or more models or components. The aggregation component 110 can, for example, represent a compiler configured to compile data associated with the query request into a computer-readable format (e.g. binary data), associate gathered metadata (where to store or send query results), query criteria, authorship, creation time, query result destination(s), and the like. In some examples, the aggregation component 110 can also or instead determine a query identifier for the query request (e.g., a new query, a change to an existing query). The query identifier is unique for each query to identify the query relative to other queries and may be based at least in part on applying a hash function to data provided to the computing device(s) 108 from the host device(s) 102 as part of the query request. Thus, the aggregation component 110 can define a query to include at least the query identifier and the compiled data which can be optionally stored in a query database (not shown) that is configured to maintain query profiles for each query request, even if only a change to a setting, parameter, or criteria of a previous query request or currently executed query.

In some examples, the aggregation component 110 may receive query results associated with events from the host devices(s) 102 and aggregate the query results for analysis and/or presentation on a display of the computing device(s) 108 and/or the host device (102). In some examples, a storage device (not shown) can store communication and security information associated with the host device(s) 102, observed activity patterns in a data stream received from the data component(s) 104 on the host device(s) 102, and the like. In various examples, a database, memory, or other storage device can store the query results and/or receive a dynamically changing data stream to have data available for testing a new query, determining query performance, or for other reasons. For example, query results associated with one or more queries can be stored in a database for use training a model, determining expected query results, or other purposes.

The query component 112 represents functionality to initiate, deploy, update, complete, or otherwise control execution of queries in each host device. For example, the query component 112 can determine a state (e.g., state data) of each query and control a transition from a first query monitoring the data stream to a second query without losing a process, a thread, an executable, or the like in the data stream. The query component 112 can determine a state of a particular query over time by identifying the query using the query identifier. By implementing the query management techniques described herein, queries can be defined and deployed to detect events (and incidents associated therewith) most likely to cause malicious behavior on the host device.

The instruction generator 114 can generate a computer-readable instruction for execution by a processor associated with a computing device (e.g., a test device, a hist device) to control each query independently using the query identifiers. State information associated with different queries can be used to capture a current query state usable for determining which instruction to generate for each query to observe potential security threats in the dynamic data stream to the host device(s) 102 (or a service agent thereof). Some example states can include a complete state, pause state, pending state, test state, production state, running state, or the like.

In some examples, the instruction generator 114 can generate a first instruction that causes a first query to stop monitoring the data stream and a second instruction that causes a second query (e.g., an update to query criteria of the first query) to start monitoring the data stream from at least point (or before) at which the first query stops monitoring. Importantly, the first query can complete backend processes related to captured data while the second query is being executed. This can be achieved, is part, by the instruction generator 114 appending or associating a respective query identifier to the first instruction and the second instruction, and enabling the computing device to dedicate computational resources (e.g., processing resources, memory resource, and the like) to a first query for a at least some time period after initiating the second query to allow the first query to execute a process that would otherwise be lost due to initiating the second query (e.g., two queries can "overlap" or otherwise use computational resources substantially simultaneously).

The monitor component 116 can be configured to monitor queries over time in a variety of ways. For example, the monitor component 116 can detect, generate, aggregate, or otherwise monitor results of running the query in a test environment and/or a production environment. The monitor component 116 can, for example, be implemented by the computing device(s) 108 to gather query results intermittently or at predetermined time intervals, determine a state of a query, determine query performance over time, and/or determine computing device performance relative to the query, just to name a few.

In some examples, the monitor component 116 can determine query performance based on monitoring characteristics of a query at a particular time or time period (e.g., a number of incidents, a time to run a query, etc.). Additionally, or alternatively, the monitoring component 116 can monitor changes in computational resources used by a specific query (e.g., processor and/or memory usage, processor time, disk write time, and the like, during execution), and determine a value indicating performance of the query for a particular time or time period based on the monitoring. In various examples, performance for different queries can be based on characteristics specific for each query (e.g., a type of query being performed, a query size, a time to execute, etc.).

The monitor component 116 can, in various examples, analyze or otherwise determine a change to the query performance over time (e.g., an increase or decrease in usage of computational resources and/or change in characteristics of the query). For instance, the monitor component 116 can determine that a query has an increasing number of incidents over time, and determine an action for the query to mitigate potential for the query to affect other queries (e.g., manage available computational resources, control execution of the query or another query, and the like).

In various examples, the monitor component 116 can determine computing device performance relative to executing the query. For example, the monitor component 116 can identify changes in computation resources used by the computing device before executing the query and after executing the query, and determine a value indicating computing device performance based on the identified changes.

In some instances, a training component (not shown) may be executed by one or more processor(s) of a computing device to train a machine learning model based on training data. The training data may include a wide variety of data, such as computer behavior data, query result data, historical data, pattern data of a data stream, pattern data of a security threat, or a combination thereof, that is associated with a value (e.g., a classification of interest, inference, prediction, etc.). Such values may generally be referred to as a "ground truth." To illustrate, the training data may be used for determining presence of a potential security impact to operation of a computing device in a data stream and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

Though depicted in FIG. 1 as separate components of the computing device(s) 108, functionality associated with the aggregation component 110, the query component 112, the instruction generator 114, and/or the monitor component 116 can be included in a different component of the service system or be included in the host device(s) 102. In some instances, the components described herein may comprise a pluggable component, such as a virtual machine, a container, a serverless function, etc., that is capable of being implemented in a service provider and/or in conjunction with any API gateway.

Figure 2:
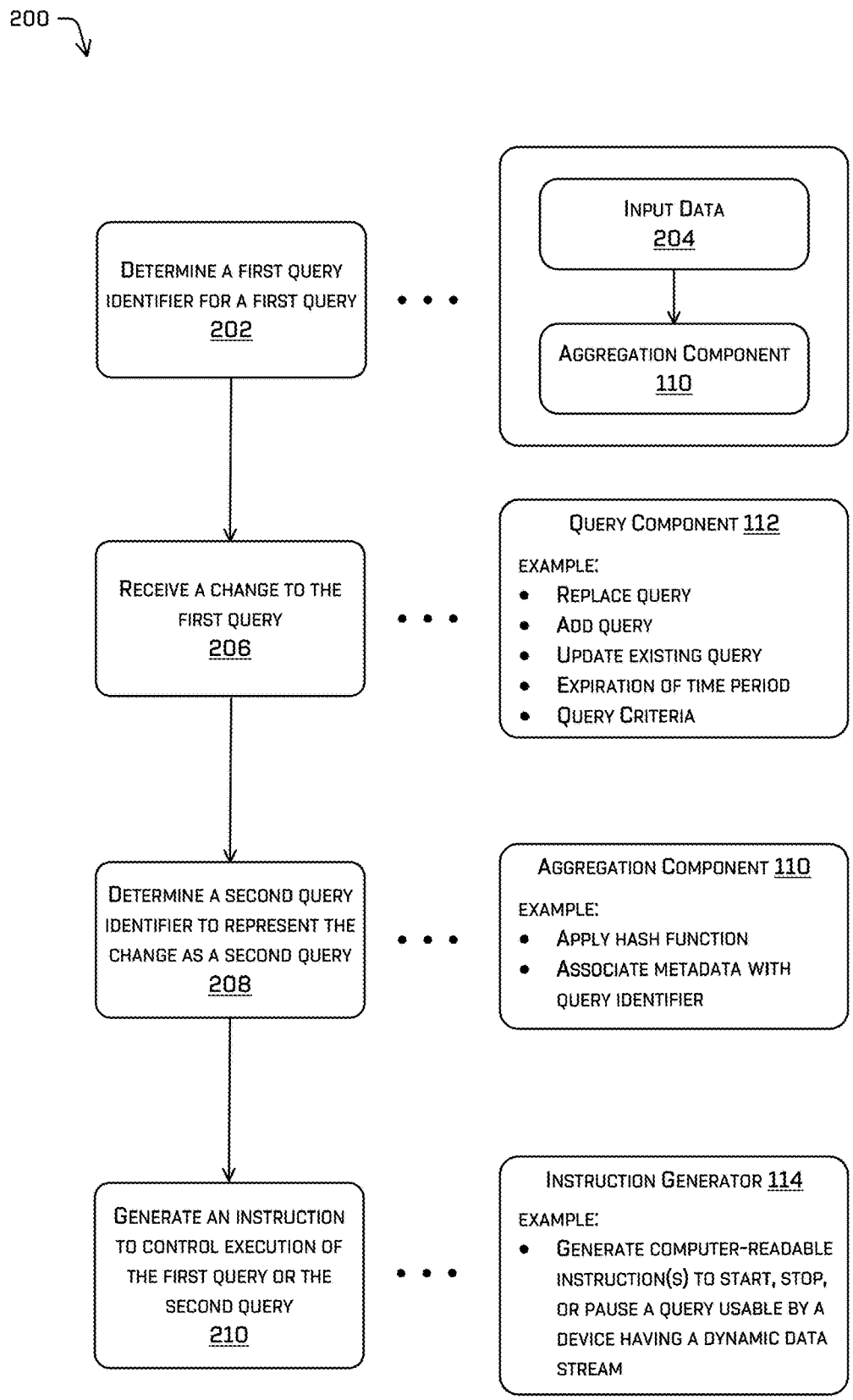
FIG. 2 is a pictorial diagram illustrating an example process to generate computer-readable instructions by one or more example components to control a query, as described herein.

FIG. 2 is a pictorial diagram illustrating an example process 200 to generate computer-readable instructions by one or more example components to control a query, as described herein. The example process 200 may be implemented by a computing device such as the computing device(s) 108 of FIG. 1. The computing device(s) 108 can implement the aggregation component 110, the query component 112, the instruction generator 114, and/or the monitor component 116 to generate a computer-readable instruction for executing by the computing device(s) 108 and/or for sending to a computing device (e.g., the host device(s) 102) to cause the computing device to start, stop, and/or pause a query associated with a dynamic data stream.

An operation 202 can include determining a first query identifier for a first query. In some examples, the aggregation component 110 can receive input data 204 which can represent a request to initiate, change, and/or end a query. The input data 204 can represent, for example, data associated with a service provider such as results of previous queries ran on a host device and/or data associated with a data stream into the host device. The input data 204 can change over time as the host device receives new data into a data stream for processing. The first query identifier can represent a value that uniquely identifies the query relative to another query, such as in memory or in a database. In some examples, the first query identifier is determined at least in part on applying a security algorithm (e.g., a hash function) to at least a portion of the input data 204. In some examples, the aggregation component 110 can use a Content Addressable Storage technique, or the like, as part of determining or storing a query identifier based on the input data 204. In some examples, the input data 204 can represent telemetry information received from one or more host devices in an environment remote from an environment associated with the computing device(s) 108 implementing the aggregation component 110.

In various examples, the input data 204 can include data associated with a third-party entity. For example, information, criteria, or other data associated with defining, deploying, and/or executing a query can be received from a third-party that is authorized to provide the data to implement the techniques described herein.

An operation 206 can include receiving a change to the first query. For example, the operation 206 can include the computing device(s) 108 implementing the query component 112 to receive data (e.g., from the host device (or user associated therewith), from the computing device(s) 108 (or user associated therewith) to replace a query, to update an existing query, or to add a query. In some examples, the change to the first query can be a request to change a process, a thread, or a pattern or behavior that the query is to identify in the data stream. For example, each query can be associated with a metric(s), or criteria, that define what "content" in the data steam to capture for analysis to determine if the "content" is potentially harmful to the host device. In some examples, the input data 204 can include an indication from a user to conduct a particular query according to particular criteria.

An operation 208 can include determining a second query identifier to represent the change as a second query. For example, the operation 208 can include the aggregation component 110 applying a hash function to data received in association with the change to the first query (e.g., data received after the request to initiate first query, which may or may not have been executed). By creating the change to the first query as a separate and new second query, a separate query identifier can be determined which enables both the first query and the second query to be controlled independently and in some examples simultaneously.

In some examples, the aggregation component 110 can determine metadata to associate with the query identifier and/or to associate with an instruction for controlling a query. The metadata can represent one or more of: a query source of the first query, a human-readable name of the first query, a creation time of the first query, a user of the first query, a location to publish query results responsive to executing the first query, a topic name, a data format for outputting query results, human-readable information, and so on.

An operation 210 can include generating an instruction to control execution of the first query or the second query. For example, the operation 210 can include the instruction generator 114 generate one or more computer-readable instructions for sending to one or more computing devices for execution. In some examples, the instruction generator 114 can generate a first computer-readable instruction to pause or stop monitoring of the data stream using the first query and also generate a second computer-readable instruction to start monitoring of the data stream using the second query. Together, the first computer-readable instruction and the second computer readable-instruction can ensure that the data stream remains monitored while further enabling the first query to complete processes as needed. Using the techniques described herein, queries can be controlled in an environment (e.g., a production environment or a test environment) to capture all data associated with a dynamically changing input.

Figure 3:
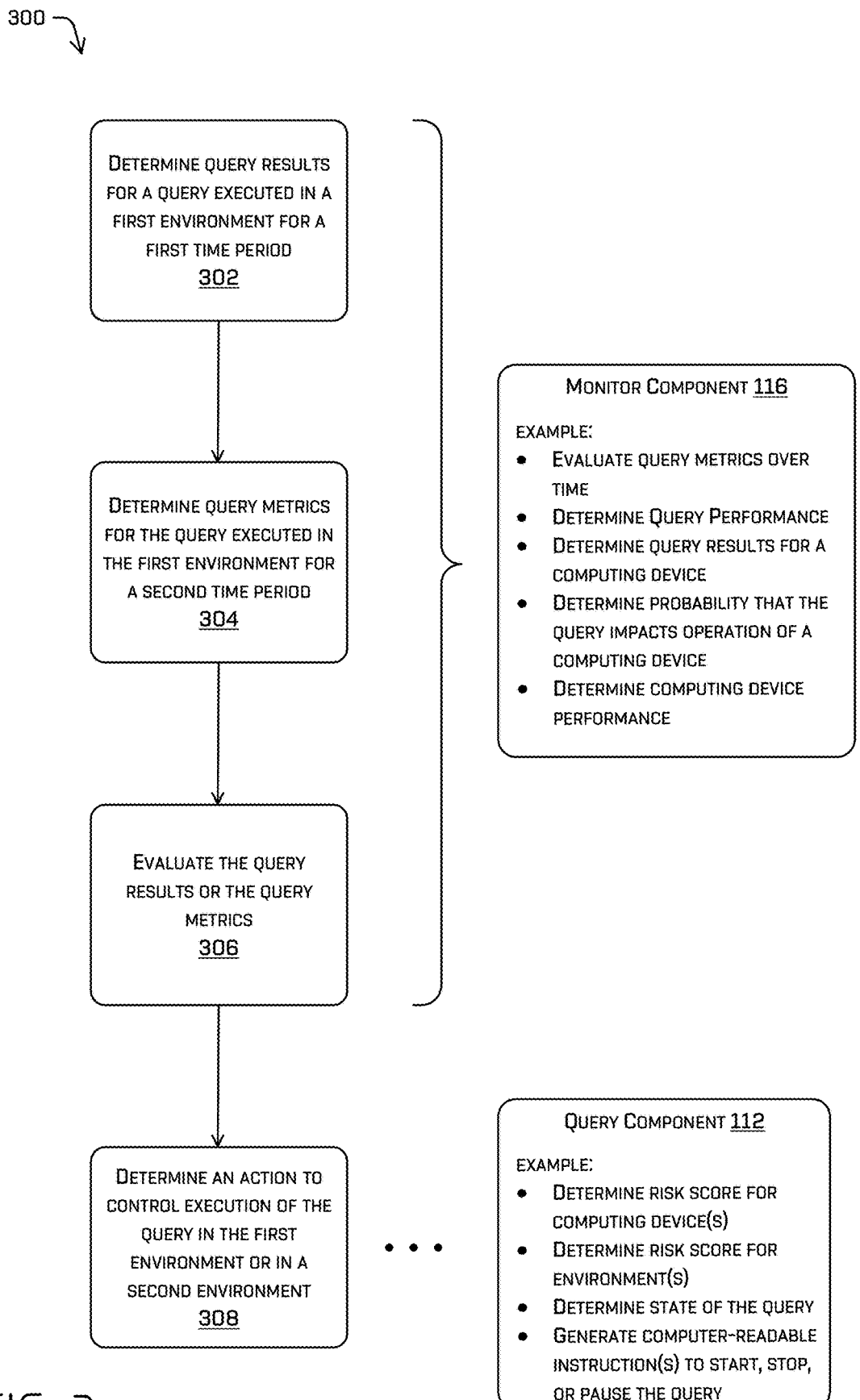
FIG. 3 is a pictorial diagram illustrating an example process to monitor and analyze query results by one or more example components to determine an action associated with a query, as described herein.

FIG. 3 is a pictorial diagram illustrating an example process 300 to monitor and analyze query results by one or more example components to determine an action associated with a query, as described herein. The example process 300 may be implemented by a computing device such as the computing device(s) 108 of FIG. 1. The computing device(s) 108 can implement the aggregation component 110, the query component 112, the instruction generator 114, and/or the monitor component 116 to generate a computer-readable instruction for sending to a computing device (e.g., the host device(s) 102) to cause the computing device to start, stop, or pause a query associated with a dynamic data stream.

An operation 302 can include determining query results for a query executed in a first environment for a first time period. For example, the monitor component 116 can receive query results for a query executed by computing device (e.g., a host device in a production environment, a test device in a test environment, and/or a computing device remote from the host device) between a first time and a second time. The query results can represent events (or incidents) gathered or detected during the first time period that meet the query criteria.

An operation 304 can include determining query metrics for the query executed in the first environment for a second time period. For example, the monitor component 116 can monitor metrics, or characteristics of the query (e.g., a number of incidents, a time to run a query, etc.) for an amount of time equal to or different from the first time period. In some examples, the first time period and the second time period can represent a same period of time. The query metrics can be determined while the query is being performed on the computing device, and can be specific for each query (e.g., different types of queries can be evaluated differently according to a unique set of metrics). In various examples, the metrics can relate to computational resources usage by a specific query (e.g., processor and/or memory usage, processor time, disk write time, and the like, during execution). In some examples, the metrics can be determined by a user associated with the computing device(s) 108 and/or a user associated with the host device 102. In examples when the first environment is a production environment, the second query results can represent results of the query being performed on the host device (or test device in examples when the first environment is a test environment).

An operation 306 can include evaluating the query results or the query metrics. For example, the monitor component 116 can compare the query results and/or the query metrics to a respective threshold to assess performance of the query at different time periods. In some examples, the monitor component 116 can compare query metrics at different times to determine whether a change in query performance occurs over time. In various examples, the monitoring component 116 can determine a probability that the query impacts operation of the device executing the query (e.g., a host device, a computing device remote from the host device, or the test device). The probability can indicate whether executing the query altered the operating system or functionality of the device by comparing key performance indicators for the device with and without the query being executed.

An operation 308 can include determining an action to control execution of the query in the first environment or in a second environment. For example, the query component 112 can determine whether to initiate, pause, or end execution of the query in a test environment (or test device thereof) or in a production environment (or host device thereof). In various examples, the query component 112 can determine the action based at least in part on the query results and/or the query metrics. For instance, the action can be based on a query result or a query metric being equal to or above a threshold (e.g., a performance threshold). In some examples, the query component 112 can determine the action based at least in part on the probability that the query impacts operation of the device, (e.g., a probability above a threshold can determine a first action (pause query, stop query, etc.) and a probability at or below the threshold can determine a second action (start query, continue query, etc.).

In some examples, one or more operations (e.g., the operation 306 or 308 can include determining a state of the query based at least in part on the query identifier determined when the query was defined. For instance, the monitoring component 116 can update a state of the query periodically to correspond to a determined action (e.g., an initiated state, a running state, a pause state, and so on). State information can be used in various determination by a component including determining a computer-readable instruction.

In various examples, the query component 112 can access, generate, or determine a risk score for the first environment, a second environment (if applicable), and computing devices thereof (e.g., a risk score for a host device or test device). In some examples, the risk scores can be defined by a user, machine learned model, heuristic model, or the like with consideration to how different environments and/or computing devices are associated with different levels of sensitive data. The risk scores can be used to determine a query action such as determining whether to deploy the query in a production environment (e.g., the second environment), or to another computing device in the first environment (e.g., another production environment or a test environment). Risk scores can also or instead be based on determining a relative importance of one environment or computing device relative to another environment or another computing device.

Figure 4:
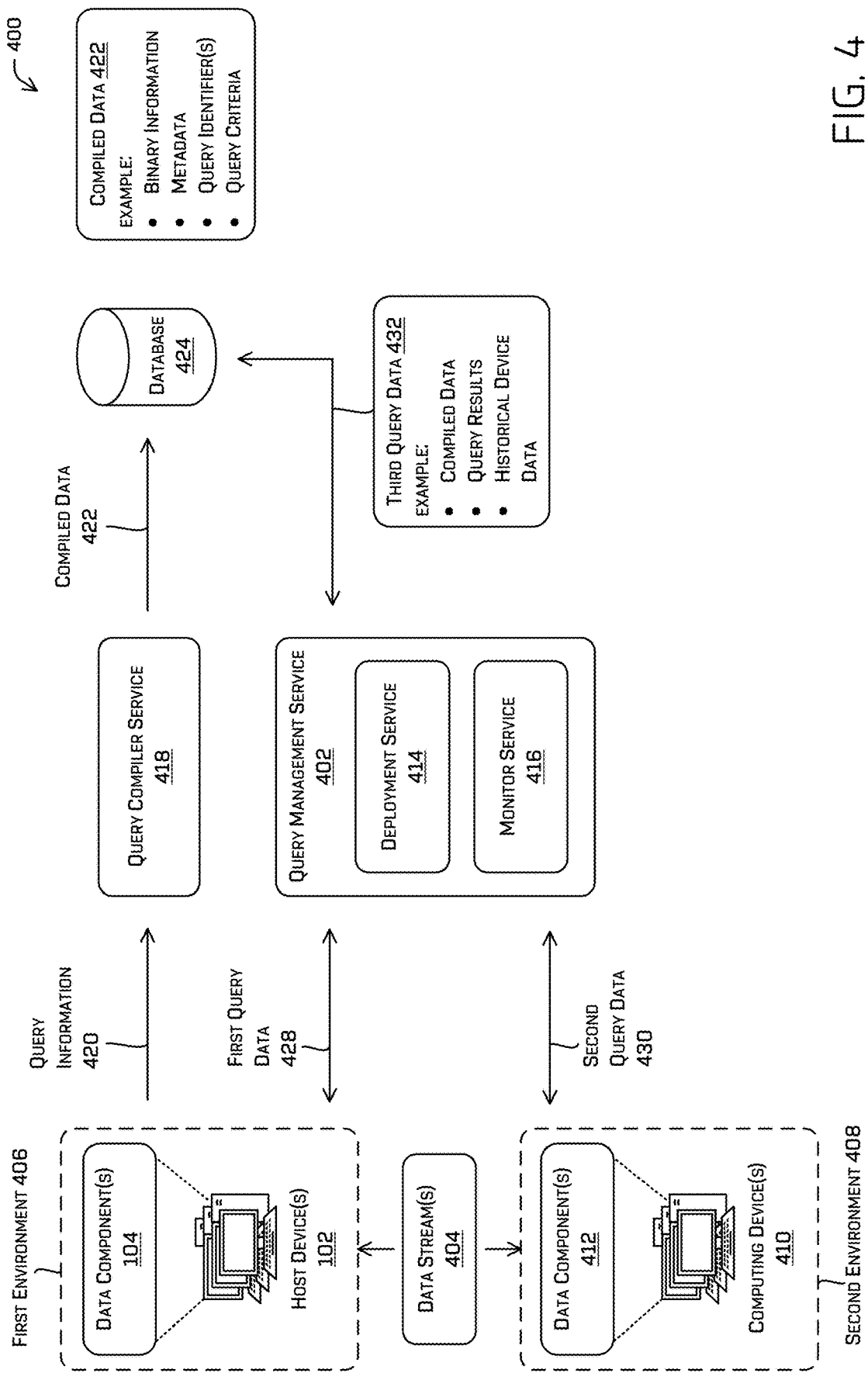
FIG. 4 is an illustration of an example environment in which an example query management service implements techniques to control a query associated with an example data stream, as described herein.

FIG. 4 is an illustration of an example environment 400 in which an example query management service implements techniques to control a query associated with an example data stream, as described herein. For example, a query management service 402 can be implemented by the computing device(s) 108 to manage queries associated with one or more data streams 404 in a first environment 406 and/or a second environment 408. The first environment can include the host device(s) 102 of FIG. 1 and the second environment 408 can include one or more computing device(s) 410 (e.g., another production environment with host device(s) or a test environment with test device(s)) which further include one or more data components 412 (e.g., configured to include at least the functionality of the data component(s) 104. In various examples, the data stream(s) 404 can change dynamically over time as new instructions, processes, and so on are received into the data stream(s) 404.

As shown, the query management service 402 includes a deployment service 414 and a monitor service 416 which can collectively perform the functionality of the aggregation component 110, the query component 112, the instruction generator 114, and/or the monitor component 116. Of course, in some example the functionality of the aforementioned components can be included in a single component (e.g., the query component 112) or service (e.g., the query management service 402).

The environment 400 also includes a query compiler service 418 configured to receive query information 420 (e.g., a request to initiate a query, change a query, end a query, and the like) from the host device(s) 102 and output compiled data 422 that can include binary information, metadata, query criteria, and/or a query identifier. The binary information can be a binary representation of the human-readable description of the query while examples of the metadata and the query criteria are discussed throughout this disclosure.

In various examples, the compiled data 422 can be stored in a database 424 for access by the query management service 402. By way of example and not limitation, the query compiler service 418 can employ a Content Addressable Storage technique to store the compiled data 422 in the database 424. For example, the query information 420 can include a request to initiate a query which can be compiled as part of the compiled data 422, and in some cases sent directly to the query management service 402 for further processing (independent of being stored in the database 424). Whether or not the compiled data 422 is stored, the deployment service 414 can determine a deployment strategy for the query associated with the compiled data 422 (e.g., which device and which environment to deploy the query).

In various examples, the query information 420 can include metric data to represent how a query, component, or computing device is evaluated or monitored with regard to a query (e.g., a user can set a new metric to measure different aspects of the data stream(s) 404). For instance, the query information 420 can represent a metric for measuring a particular set of processes, threads, executables, or the like. For example, a first metric can define a memory or location to monitor activity, and other metrics can define a process to another host device (e.g., lateral movement). Changes to the metrics can occur over time to cause the query to behave differently, and each change (or set of changes received in a single request) can be assigned a new query identifier.

The query management service 402 can generate a computer-readable instruction for sending as part of the first query data 428 to the host device(s) 102. In some examples, the first query data 428 can include query results after deployment of the query for execution. The first query data 428 may also or instead include query criteria, a query identifier, security information for securing the data, etc.

The monitor service 416 can monitor the data streams(s) 404 by initiating the query based on the query management service 402 sending the computer-readable instruction to the host device(s) 102. In some examples, the deployment service 414 can initiate sending a second computer-readable instruction as part of second query data 430 to the computing device(s) 410 (or the data component thereof). Generally, the second query data 430 can include at least some of the information discussed in relation to the first query data 428.

The query management service 402 can, in various examples, exchange third query data 432 with the database 424 to implement the techniques described herein. The third query data can include the compiled data 422, query results, and/or historical data associated with a computing device (e.g., past query activity), for example.

Figure 5:
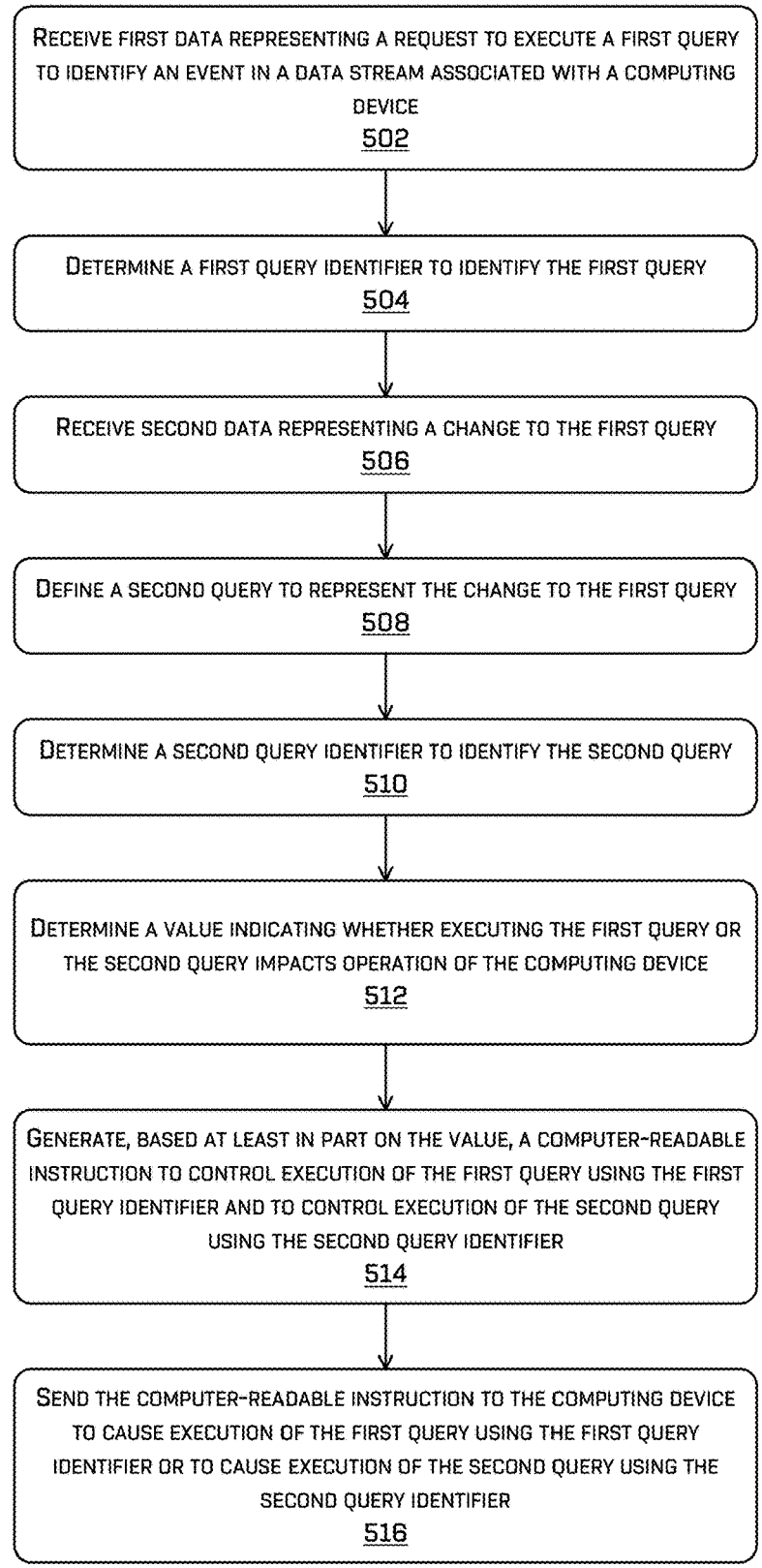
FIG. 5 is a flowchart depicting an example process for generating a query identifier and an instruction usable to control a query in an example environment.

FIG. 5 is a flowchart depicting an example process 500 for generating a query identifier and an instruction usable to control a query in an example environment. Some or all of the process 500 may be performed by one or more components in FIG. 1 and/or one or more services of FIG. 4, as described herein. For example, some or all of process 500 may be performed by the computing device(s) 108 and/or the query management service 402.

At operation 502, the process can include receiving first data representing a request to execute a first query to identify an event in a data stream associated with a computing device. In some examples, the operation 502 can include the computing device(s) 108 receiving data (e.g., from a user input via a user interface, from a model, from the host device 102, etc.) indicating to initiate a query for use in detecting activity (e.g., a potentially malicious process or thread, an instruction to write data to a memory, file, or the like) in the data stream of the computing device.

At operation 504, the process can include determining a first query identifier to identify the first query. For example, the query component 112 can determine a value that identifies the first query relative to another query (e.g., by applying a hash function to a portion of the first data).

At operation 506, the process can include receiving second data representing a change to the first query. For instance, the computing device(s) 108 can receive data indicating that the first query perform some new function such as monitoring for a new process. In various examples, the computing device(s) can receive the second data after receiving the first data, and in some examples, the first query may have begun executing on the host device(s) 102 before the second data is received, though the first query may also be executed instead in a test environment, or not yet be initiated at a time the second data is received, depending on the implementation.

At operation 508, the process can include defining a second query to represent the change to the first query. For instance, the query component 112 can determine that the change to the first query is to be represented as another query (e.g., the second query). In various examples, changing a query can include modifying an instruction to fix a bug, improve query efficiency, improve query detection, among others.

At operation 510, the process can include determining a second query identifier to identify the second query. For instance, the query component 112 can determine a second value that identifies the second query relative to the first query. In some examples, the first query identifier or the second query identifier can represent a hash value.

At operation 512, the process can include determining a value indicating whether executing the first query or the second query impacts operation of the computing device. For example, the computing device(s) 108 can implement the monitor component 116 to analyze query results for one or more time periods as the query is executed in an environment (e.g., a test environment or a production environment). The monitor component 116 can also or instead determine performance of the host device when the query is executed in the production environment or performance of a test device when the query is executed in the test environment. In various examples, the test environment can be located within a physical proximity of the production environment (or in some cases be within the production environment), so that the test device "mirrors" or otherwise substantially replicates operation by the host device.

At operation 514, the process can include generating, based at least in part on the probability, a computer-readable instruction to control execution of the first query using the first query identifier and to control execution of the second query using the second query identifier. For example, the computing device(s) 108 can implement the instruction generator 114 to generate a computer-readable instruction (or separate instructions for each of the first query or the second query) for sending to a computing device to cause the first query or the second query to pause, start, or stop execution relative to the other of the first query or the second query.

At operation 516, the process can include sending the computer-readable instruction to the computing device to cause execution of the first query using the first query identifier or to cause execution of the second query using the second query identifier. For example, the computing device(s) 108 can send the computer-readable instruction, the query identifier, and any related metadata to one or more host devices, test devices, or to a component of the computing device(s) 108. In this way, queries executed by a respective device can be controlled specific to each device in each environment.

Figure 6:
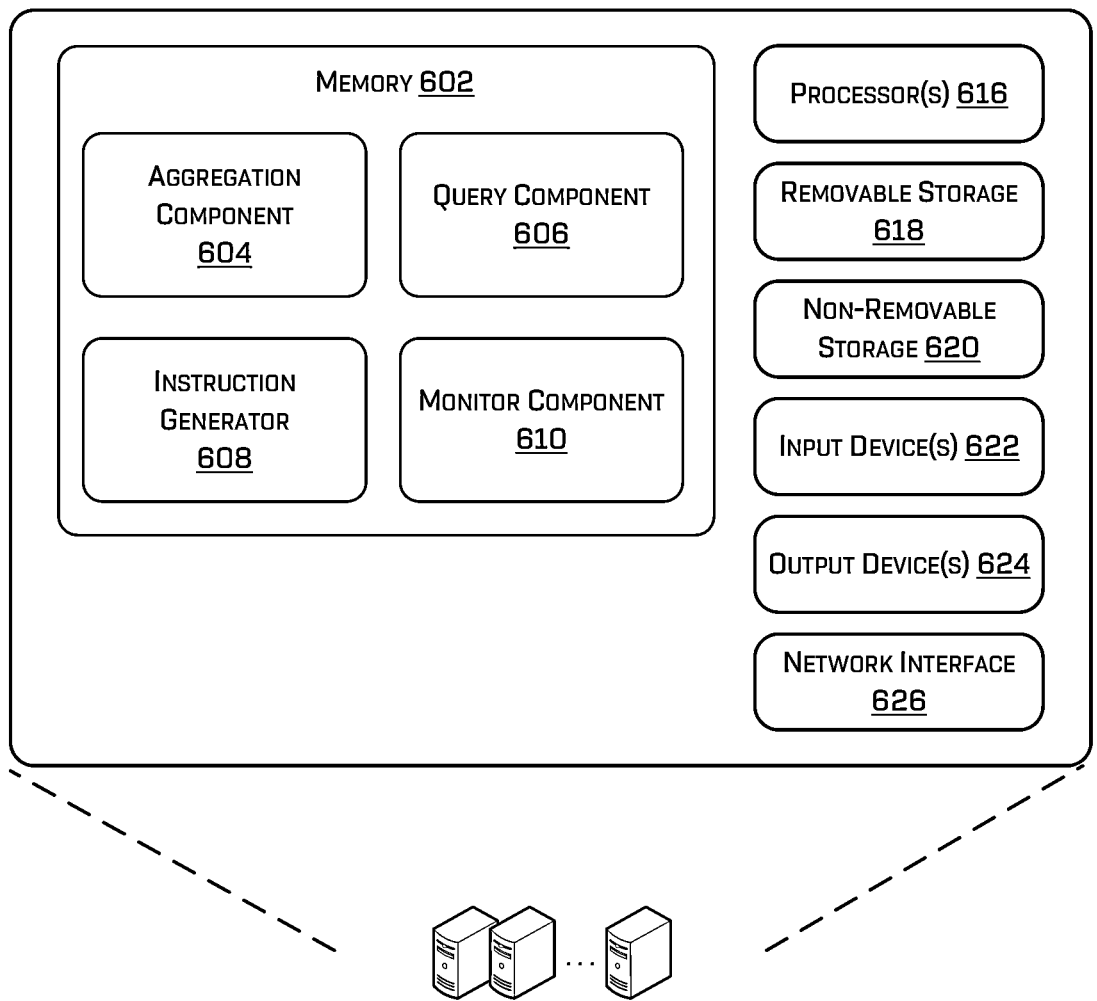
FIG. 6 is a block diagram of an illustrative computing architecture to implement the techniques describe herein.

FIG. 6 is a block diagram of an illustrative computing architecture of the computing device(s) 600. In some embodiments, the computing device(s) 600 can correspond to the host device(s) 102 or the computing device(s) 108 of FIG. 1. It is to be understood in the context of this disclosure that the computing device(s) 600 can be implemented as a single device or as a plurality of devices with components and data distributed among them. By way of example, and without limitation, the computing device(s) 600 can be implemented as various computing device 600(1), 600(2), ..., 600(N) where N is an integer greater than 1.

As illustrated, the computing device(s) 600 comprises a memory 602 storing an aggregation component 604, a query component 606, an instruction generator 608, and a monitor component 610. Also, the computing device(s) 600 includes processor(s) 616, a removable storage 618 and non-removable storage 620, input device(s) 622, output device(s) 624, and network interface 626.

In various embodiments, memory 602 is volatile (such as RAM), non-volatile (such as ROM, flash memory, etc.) or some combination of the two. The aggregation component 604, the query component 606, the instruction generator 608, and the monitor component 610 stored in the memory 602 can comprise methods, threads, processes, applications or any other sort of executable instructions. The aggregation component 604, the query component 606, the instruction generator 608, and the monitor component 610 can also include files and databases.

In various embodiments, the computer-readable memory 602 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 602 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 602 may be part of the security service system.

The aggregation component 604 may receive and store any client entity information and their associated security information including observed activity patterns received from the data component 104 on the respective host device(s) 102. The aggregation component 604 may gather data from other modules that may be stored in a data store. In some embodiments, the aggregation component 604 may gather and store data associated with known information, such as domain information that is associated with known entities, for use as enrichment data by the query component 606 (or other component).

In some examples, the aggregation component 604 can correspond to, or otherwise include the functionality of, the aggregation component 110 of FIG. 1.

In some instances, the query component 606 can correspond to, or otherwise include the functionality of, the query component 112 of FIG. 1.

In some instances, the instruction generator 608 can correspond to, or otherwise include the functionality of, the instruction generator 114 of FIG. 1.

In some instances, the monitor component 610 can correspond to, or otherwise include the functionality of, the monitor component 116 of FIG. 1.

In some instances, any or all of the devices and/or components of the computing device(s) 600 may have features or functionality in addition to those that FIG. 6 illustrates. For example, some or all of the functionality described as residing within any or all of the computing device(s) 600 may reside remotely from that/those computing device(s) 600, in some implementations.

The computing device(s) 600 may be configured to communicate over a telecommunications network using any common wireless and/or wired network access technology. Moreover, the computing device(s) 600 may be configured to run any compatible device operating system (OS), including but not limited to, Microsoft Windows Mobile, Google Android, Apple iOS, Linux Mobile, as well as any other common mobile device OS.

The computing device(s) 600 also can include input device(s) 622, such as a keypad, a cursor control, a touch-sensitive display, voice input device, etc., and output device(s) 624 such as a display, speakers, printers, etc. These devices are well known in the art and need not be discussed at length here.

As illustrated in FIG. 6, the computing device(s) 600 also includes the network interface 626 that enables the computing device(s) 600 of the security service system to communicate with other computing devices, such as any or all of the host device(s) 102.

FIGS. 2, 3, and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 5 may omit operation 506, 508, 510, and 516 while the example process of FIG. 3 may omit one of operation 302 or operation 304.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s)

of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
a compiler configured to compile query data for performing a first query to identify an activity in a data stream associated with a host device;
a query component configured to control operation of the first query on a computing device;
one or more processors; and
one or more non-transitory computer-readable media storing computer-executable instructions that, when executed, cause the one or more processors to perform operations comprising:
receiving, by the compiler and from the computing device, first data representing a request to execute the first query to identify the activity in the data stream;
determining, by the compiler and based at least in part on the first data, a first query identifier to identify the first query;
receiving, by the compiler and from the computing device, second data representing a change to the first query;
defining a second query to represent the change to the first query;
determining, by the compiler and based at least in part on the second data, a second query identifier to identify the second query;
determining, by the compiler, a probability that executing the first query or the second query impacts operation of the computing device;
generating, by the query component and based at least in part on the probability, a computer-readable instruction to cause at least one process associated with the first query to execute after initiating the second query; and
sending the computer-readable instruction to the computing device to control execution of the second query using the second query identifier and to control execution of the first query using the first query identifier.

2. The system of claim 1, wherein:
the computer-readable instruction causes the computing device to transition from performing the first query to performing the second query by assigning a portion of available computational resources to completing the at least one process associated with the first query after executing the second query,
the activity in the data stream represents a process or a thread, and
the computing device comprises the host device in a production environment.

3. The system of claim 1, wherein:
the data stream changes dynamically from a first time associated with receiving the first data to a second time associated with the receiving the second data, and
the computer-readable instruction causes the computing device to execute the first query and the second query at a same time.

4. The system of claim 1, further comprising:
a data stream database configured to receive data from the data stream for storage, wherein determining the probability that executing the first query or the second query impacts operation of the computing device comprises:
accessing, by the compiler, a subset of the data from the data stream database;
determining metrics associated with executing the first query on the computing device to monitor the subset of the data;
comparing the metrics to a performance threshold; and
determining to initiate the first query on the host device based at least in part on the comparing.

5. The system of claim 1, further comprising:
a monitor component configured to monitor the first query on the computing device over a time period, and the operations further comprising;
executing the first query on the computing device;
determining, by the monitor component, results of executing the first query for the time period, the results indicating a number of events meeting criteria associated with the first query; and
determining the probability that executing the first query impacts operation of the computing device based at least in part on the results.

6. The system of claim 1, further comprising:
a query database configured to store the query data compiled by the compiler, and the operations further comprising;
determining metadata to associate with the first query, the metadata comprising one or more of: a query source of the first query, a human-readable name of the first query, a creation time of the first query, a user of the first query, a topic name, a data format for outputting query results, or a location to publish the query results responsive to executing the first query;
associating the metadata with the first query identifier as a first query profile; and
storing the first query profile in the query database.

7. The system of claim 1, the operations further comprising:
determining, by the query component, state data indicating a state of the first query at a particular time, the state indicating one of: a test state indicating the first query is operating in a test environment, a production state indicating the first query is operating in an environment, or a complete state indicating the first query is not operating,
wherein generating the computer-readable instruction is further based at least in part on the state data.

8. The system of claim 1, wherein determining the first query identifier comprises applying a hash function to at least a portion of the first data.

9. One or more non-transitory computer-readable media storing instructions executable by one or more processors, wherein the instructions, when executed, cause the one or more processors to perform operations comprising:
receiving first data representing a request to execute a first query to identify an event in a data stream associated with a computing device;
determining a first query identifier to identify the first query;
receiving second data representing a change to the first query;
defining a second query to represent the change to the first query;
determining a second query identifier to identify the second query;
determining a value indicating whether executing the first query or the second query impacts operation of the computing device;
generating, based at least in part on the value, a computer-readable instruction to control execution of the first query using the first query identifier and to control execution of the second query using the second query identifier; and
sending the computer-readable instruction to the computing device to cause execution of the first query using the first query identifier or to cause execution of the second query using the second query identifier.

10. The one or more non-transitory computer-readable media of claim 9, wherein:
the data stream changes dynamically from a first time associated with receiving the first data to a second time associated with the receiving the second data, and
the computer-readable instruction causes the computing device to execute the first query and the second query at a same time.

11. The one or more non-transitory computer-readable media of claim 9, the operations further comprising:
accessing a subset of the first data or the second data from a data stream database that includes a copy of the data stream;
determining metrics associated with executing the first query on the computing device to monitor the subset of the first data or the second data;
comparing the metrics to a performance threshold; and
determining to initiate the first query on the computing device or a host device based at least in part on the comparing.

12. The one or more non-transitory computer-readable media of claim 9, the operations further comprising:
executing the first query on the computing device;
determining results of executing the first query for a time period, the results indicating a number of events meeting criteria associated with the first query; and
determining the value that executing the first query impacts operation of the computing device based at least in part on the results.

13. The one or more non-transitory computer-readable media of claim 12, wherein the results are first results, the time period is a first time period, and the operations further comprise:
determining second results of executing the first query for a second time period;
and
determining whether to end executing the first query based at least in part on the second results.

14. The one or more non-transitory computer-readable media of claim 9, the operations further comprising:
determining metadata to associate with the first query, the metadata comprising one or more of: a query source of the first query, a human-readable name of the first query, a creation time of the first query, a user of the first query, a topic name, a data format for outputting query results, or a location to publish the query results responsive to executing the first query;
associating the metadata with the first query identifier as a first query profile; and
storing the first query profile in a database.

15. The one or more non-transitory computer-readable media of claim 9, the operations further comprising:
determining state data indicating a state of the first query at a particular time, the state indicating one of: a test state indicating the first query is operating on a test device in a test environment, a production state indicating the first query is operating on the computing device in a production environment, or a complete state indicating the first query is not currently being executed,
wherein generating the computer-readable instruction is further based at least in part on the state data.

16. The one or more non-transitory computer-readable media of claim 9,
wherein the computer-readable instruction causes the computing device to transition from performing the first query to performing the second query by assigning a portion of available computational resources to complete at least one process associated with the first query after executing the second query.

17. A computer-implemented method comprising:
receiving first data representing a request to execute a first query to identify an event in a data stream associated with a computing device;
determining a first query identifier to identify the first query;

receiving second data representing a change to the first query;

defining a second query to represent the change to the first query;

determining a second query identifier to identify the second query;

determining a value indicating whether executing the first query or the second query impacts operation of the computing device;

generating, based at least in part on the value, a computer-readable instruction to control execution of the first query using the first query identifier and to control execution of the second query using the second query identifier; and sending the computer-readable instruction to the computing device to cause execution of the first query using the first query identifier or to cause execution of the second query using the second query identifier.

18. The computer-implemented method of claim 17, wherein:

the data stream changes dynamically from a first time associated with receiving the first data to a second time associated with the receiving the second data, and the computer-readable instruction causes the computing device to execute the first query and the second query at a same time.

19. The computer-implemented method of claim 17, further comprising:

accessing a subset of the first data or the second data from a data stream database that includes a copy of the data stream;

determining metrics associated with executing the first query on the computing device to monitor the subset of the first data or the second data;

comparing the metrics to a performance threshold; and determining to initiate the first query on the computing device or a host device based at least in part on the comparing.

20. The computer-implemented method of claim 17, further comprising:

executing the first query on the computing device;

determining results of executing the first query for a time period, the results indicating a number of events meeting criteria associated with the first query; and determining the value that executing the first query impacts operation of the computing device based at least in part on the results.

* * * * *